(12) United States Patent
Hatano et al.

(10) Patent No.: US 8,270,076 B2
(45) Date of Patent: Sep. 18, 2012

(54) RETARDATION FILM

(75) Inventors: Taku Hatano, Tokyo (JP); Shunsuke Yamanaka, Tokyo (JP)

(73) Assignee: Zeon Corporation, Tokyo (JP)

( * ) Notice: Subject to any disclaimer, the term of this patent is extended or adjusted under 35 U.S.C. 154(b) by 525 days.

(21) Appl. No.: 12/406,737

(22) Filed: Mar. 18, 2009

(65) Prior Publication Data

US 2009/0237790 A1  Sep. 24, 2009

Related U.S. Application Data

(60) Provisional application No. 61/080,962, filed on Jul. 15, 2008.

(30) Foreign Application Priority Data

Mar. 18, 2008 (JP) ................... 2008-069540

(51) Int. Cl.
*G02B 5/30* (2006.01)

(52) U.S. Cl. .................. 359/489.15

(58) Field of Classification Search .......... None
See application file for complete search history.

(56) References Cited

U.S. PATENT DOCUMENTS

| | | | |
|---|---|---|---|
| 2002/0005925 A1 | 1/2002 | Arakawa | |
| 2006/0066787 A1 | 3/2006 | Yoda et al. | |

FOREIGN PATENT DOCUMENTS

| | | |
|---|---|---|
| EP | 0 424 951 A1 | 5/1991 |
| EP | 0 660 141 A2 | 6/1995 |
| EP | 1 998 196 A1 | 12/2008 |
| JP | 3-141303 A | 6/1991 |
| JP | 4-311903 A | 11/1992 |
| JP | 2002-156525 A | 5/2002 |
| JP | 2007-232873 A | 9/2007 |

OTHER PUBLICATIONS

J.A. Charles, F.A.A. Crane, J.A.G. Furness: "Selection and use of engineering materials", Edition 3—1997, Elsevier, XP002539814, p. 133; table 10.3.

*Primary Examiner* — Derek S Chapel
(74) *Attorney, Agent, or Firm* — Birch, Stewart, Kolasch & Birch, LLP

(57) ABSTRACT

A retardation film composed of a laminated film which comprises a layer A composed of a material having a positive intrinsic birefringence and a layer B composed of a material having a negative intrinsic birefringence; the retardation film has a stretching temperature $T_\alpha$ which causes delaying of a phase after the stretching to a phase before the stretching and a stretching temperature $T_\beta$ which causes hastening of a phase after the stretching to a phase before the stretching, in cases of uniaxially stretching in a direction of an X axis by draw ratio of 1.25, in which the phase is of linearly polarized light $\Psi X$ in relation to linearly polarized light $\Psi Y$, the X axis is an uniaxially stretching direction; and the retardation film satisfies $0.92 \leq R_{40}/Re \leq 1.08$, wherein Re (nm) and $R_{40}$ (nm) are retardation values of light having a wavelength of 550 nm.

6 Claims, 1 Drawing Sheet

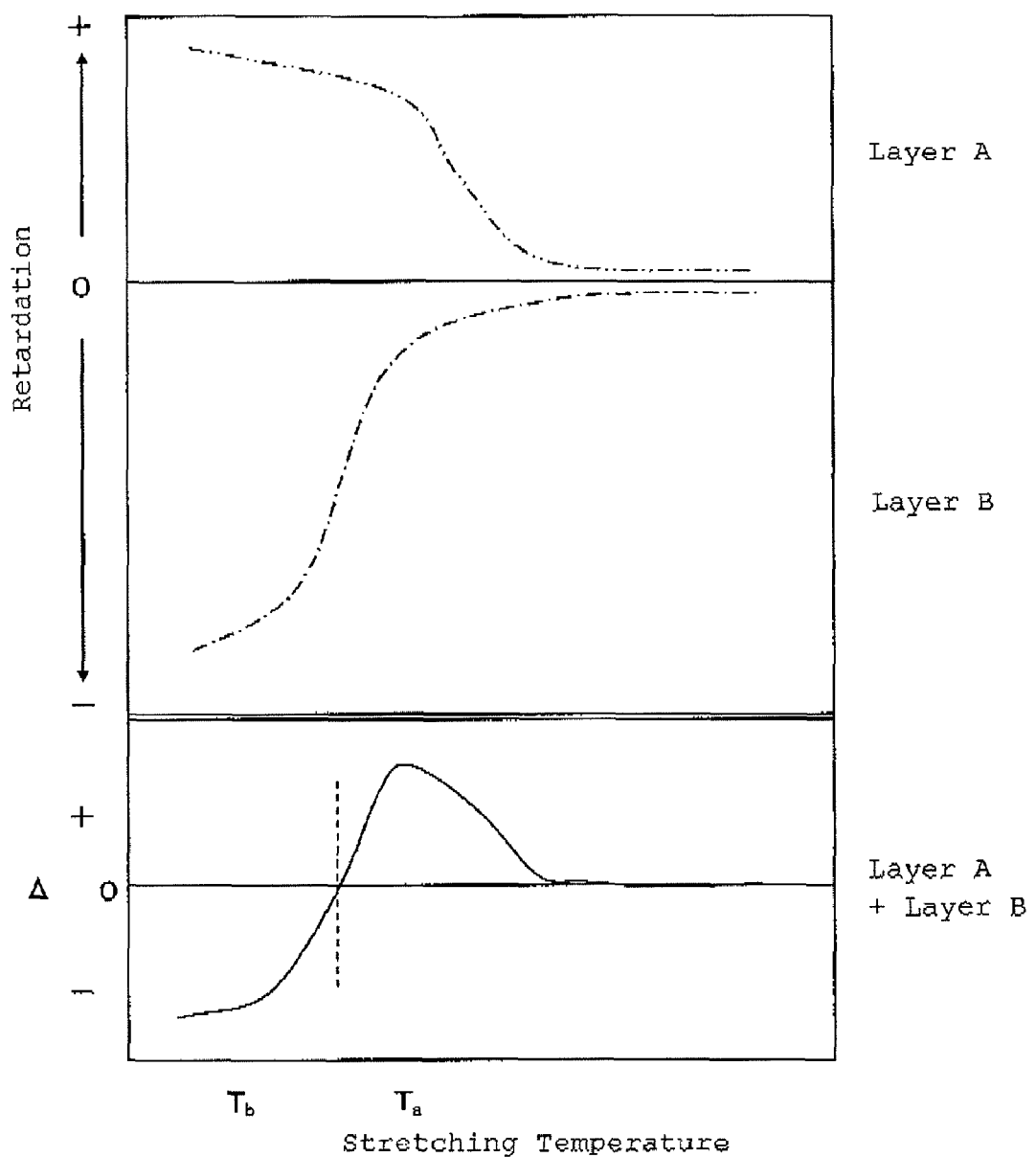

RETARDATION FIELD

RETARDATION FILM

This Nonprovisional application claims priority under 35 U.S.C. §119(e) on U.S. Provisional Application No(s). 61/080,962 filed on Jul. 15, 2008 and under 35 U.S.C. §119(a) on Patent Application No(s). 2008-069540 filed in Japan on Mar. 18, 2008, the entire contents of both applications are hereby incorporated by reference.

TECHNICAL FIELD

The present invention relates to a retardation film.

More particularly, the present invention relates to a retardation film in which a birefringence compensation in a liquid crystal display device doesn't change even if the retardation film is left under a hot environment.

BACKGROUND OF THE ART

To decrease a dependence of a color tone of a liquid crystal display device on an angle, a retardation film which meets a relation of $0.92 \leq R_{40}/Re \leq 1.08$, wherein Re is a retardation value at an incident angle of 0 degree and $R_{40}$ is a retardation value at an incident angle of 40 degrees, or a retardation film which meets a relation of $n_x > n_z > n_y$, wherein $n_x$ is a refractive index in a direction of a slow axis in a plane of the film, $n_y$ is a refractive index in a direction perpendicular to the direction of the slow axis in the plane, $n_z$ is a refractive index in a thickness direction has been proposed.

For example, Patent Document 1 discloses that a first anisotropic film is obtained by uniaxially stretching a polycarbonate resin film, a second anisotropic film is obtained by uniaxially stretching a polystyrene resin film on the other hand, and then the first anisotropic film and the second anisotropic film are overlapped so that directions of stretching of the films are at right angles to each other to obtain a retardation film which meets a relation of $n_x > n_z > n_y$.

Moreover, Patent Document 2 discloses that a first anisotropic film is obtained by uniaxially stretching a polycarbonate resin film, a second anisotropic film is obtained by uniaxially stretching a polystyrene resin film on the other hand, and then the first anisotropic film and the second anisotropic film are overlapped so that directions of stretching of the films are at right angles to each other to obtain a retardation film which meets a relation of $(Re-Re_{40})/Re \leq 0.07$.

Patent Document 3 discloses that a laminate is formed by bonding a shrinkable film to one side or both sides of a resin film before the resin film is stretched, and then the laminate is stretched and heated to apply contractive force to the laminate in a direction orthogonal to the direction of stretching of the above-mentioned resin film to obtain a retardation film which meets a relation of $0<(n_x-n_z)/(n_x-n_y)<1$.

Patent Document 4 discloses that a rod is obtained by extrusion of a melted polycarbonate resin, a disc is obtained by slicing up the rod in round, a rectangular plate is obtained by cutting the disc, and a retardation film which meets a relation of $0.92 \leq Re_{40}/Re \leq 1.08$ is obtained by uniaxially stretching the rectangular plate.

[Patent Document 1] JP-A-H03-24502
[Patent Document 2] JP-A-HO3-141303
[Patent Document 3] JP-A-HOS-157911
[Patent Document 4] JP-A-H02-160204

DISCLOSURE OF THE INVENTION

Problems to be Resolved by the Invention

However, as for the retardation films described in the patent documents, a deviation of a birefringence compensation is occasionally caused because the retardation value of the retardation film changes if the retardation film is left under a hot environment. Then, an object of the present invention is to provide a retardation film in which a birefringence compensation of a liquid crystal display device doesn't change even if the retardation film is left under a hot environment.

Means for Solving the Problems

As the result of studies by the present inventors to achieve the above-mentioned object, it was found that a retardation film make a change of a birefringence compensation of a liquid crystal display device prevented even if it is left under a hot environment, in which the retardation film is composed of a laminated film which comprises a layer A composed of a material having a positive intrinsic birefringence and a deflection temperature under load of Ts(A) and a layer B composed of a material having a negative intrinsic birefringence and a deflection temperature under load of Ts(B), in which a difference between Ts(A) and Ts(B) is 5° C. or more, and the retardation film meets a specific relationship between a phase after stretching and a phase before stretching in cases of uniaxially stretching at temperature in the range that the retardation film can be stretched, and the retardation film meets a specific relationship between Re (nm) and $R_{40}$ (nm) in which Re is a retardation value of light having a wavelength of 550 nit at an incident angle of 0 degree and $R_{40}$ is a retardation value of light having a wavelength of 550 nm at an incident angle of 40 degrees. The inventors advanced study further on the basis of these findings, and then the present invention has been completed.

That is, the present invention includes the following modes.

(1) A retardation film composed of a laminated film which comprises a layer A composed of a material having a positive intrinsic birefringence and a deflection temperature under load of Ts(A) and a layer B composed of a material having a negative intrinsic birefringence and a deflection temperature under load of Ts(B), in which a difference between Ts(A) and Ts(B) is 5° C. or more;

the retardation film has a stretching temperature $T_\alpha$ which causes delaying of a phase after the stretching to a phase before the stretching and a stretching temperature $T_\beta$ which causes hastening of a phase after the stretching to a phase before the stretching, in cases of uniaxially stretching in a direction of an X axis by draw ratio of 1.25 at temperature in the range that the retardation film can be stretched, in which the phase is of linearly polarized light ΨX having an oscillating surface of an electric vector in an X-Z plane and entering at an incident angle of 0 degree in relation to linearly polarized light ΨY having an oscillating surface of an electric vector in a Y-Z plane and entering at an incident angle of 0 degree, the X axis is an uniaxially stretching direction, the Y axis is a direction perpendicular to a direction of the X axis in the film plane, and the Z axis is a direction of a thickness of the film; and the retardation film meets a relation of $0.92 \leq R_{40}/Re \leq 1.08$, wherein Re (nm) is a retardation value of light having a wavelength of 550 nm at an incident angle of 0 degree, and $R_{40}$ (nm) is a retardation value of light having a wavelength of 550 nm at an incident angle of 40 degrees.

(2) The retardation film according to the above (1), in which the layer A and the layer B are in direct contact.

(3) The retardation film according to the above (1) or (2), in which a ratio of the sum total thickness of the layer A/the sum total thickness of the layer B is 1/5 to 1/10.

(4) The retardation film according to any one of the above (1) to (3), in which the material having a positive intrinsic birefringence is polycarbonate resins, and the material having a negative intrinsic birefringence is polystyrene resins.
(5) A method for manufacturing the retardation film according to any one of the above (1) to (4) comprising steps of:
preparing a laminate comprising an unstretched film (a) composed of a material having a positive intrinsic birefringence and a deflection temperature under load of Ts(A) and an unstretched film (b) composed of a material having a negative intrinsic birefringence and a deflection temperature under load of Ts(B);
first simultaneously uniaxially stretching the laminate in a first direction at a temperature of T1(° C.) that is higher than the lower of Ts(A) and Ts(B) by 5° C. or more; and
second simultaneously uniaxially stretching the laminate in a second direction that is different from the first direction at a temperature of T2(° C.) that is lower than the higher of Ts(A) and Ts(B) and is different from T1.
(6) The method for manufacturing the retardation film according to the above (5), in which T2 is lower than both Ts(A) and Ts(B).

ADVANTAGES OF THE INVENTION

Using a retardation film of the present invention can provide a liquid crystal display device of which a birefringence compensation doesn't change even if it is left under a hot-environment and which has an excellent durability.

BRIEF DESCRIPTION OF THE DRAWINGS

FIG. 1 shows a temperature dependence of phase difference of layer A, layer B, and a laminate of layer A and layer B.

BEST MODE FOR CARRYING OUT THE INVENTION

A retardation film in the present invention is composed of a laminated film which comprises a layer A composed of a material having a positive intrinsic birefringence and a deflection temperature under load of Ts(A) and a layer B composed of a material having a negative intrinsic birefringence and a deflection temperature under load of Ts(B). Here, the layer A and the layer B may have each one layer or more than two layers.

The material used for the layer A has a positive intrinsic birefringence and a deflection temperature under load of Ts(A). Thermoplastic resin A is usually used as the material. The "positive intrinsic birefringence" means that a refractive index of a stretching direction is bigger than a refractive index of a direction orthogonal to the stretching direction. An intrinsic birefringence may be calculated from the permittivity distribution.

The thermoplastic resin A includes olefin resins such as polyethylene, polypropylene, and the like; polyester resins such as polyethylene terephthalates, polybutylene terephthalates, and the like; polyarylene sulfide resins such as polyphenylene sulfides, and the like; polyvinyl alcohol resins, polycatbonate resins, polyarylate resins, cellulose ester resins, polyether sulfone resins, polysulfone resins, polyallyl sulfone resins, polyvinyl chloride resins, norbornene resins, rod-like liquid crystalline polymers and so on. The resin may be used as single or in combination of two or more. In the present invention, among these, polycarbonate resins are preferable according to the viewpoint of an appearance of a phase difference, a stretching property at a low temperature, and the adhesive quality with another layer.

A deflection temperature under load Ts(A) of the above-mentioned thermoplastic resin A is preferably 80° C. or more, more preferably 110° C. or more, and particularly preferably 120° C. or more. When the deflection temperature under load is lower than the above-mentioned lower limit value, an orientation easily relaxes.

The material used in the layer B has a negative intrinsic birefringence and a deflection temperature under load of Ts(B). Thermoplastic resin B is usually used as the material. The "negative intrinsic birefringence" means that a refractive index of a stretching direction is smaller than a refractive index of a direction orthogonal to the stretching direction. An intrinsic birefringence may be calculated from the permittivity distribution.

The thermoplastic resin B includes polystyrene-based resins such as homopolymer of styrene or styrene derivative, or copolymers thereof with other monomer; polyacrylonitrile resins, polymethyl methacrylate resins, or multicomponent copolymers thereof and the like. The resin may be used as single or in combination of two or more. As the other monomer which is contained in the polystyrene-based resins, acrylonitrile, maleic anhydride, methyl methacrylate, and butadiene are preferably mentioned. In the present invention, among these polymers, polystyrene-based resin is preferable in the viewpoint of an excellent appearance of a phase difference, and moreover the copolymer of styrene or styrene derivative and maleic anhydride is especially preferable in the point of excellent thermal resistance.

A deflection temperature under load Ts(B) of the above-mentioned thermoplastic resin B is preferably 80° C. or more, more preferably 110° C. or more, and particularly preferably 120° C. or more. When the deflection temperature under load is lower than the above-mentioned lower limit value, an orientation easily relaxes.

An absolute value of a difference between the deflection temperature under load Ts(A) of a thermoplastic resin A and the deflection temperature under load Ts(B) of a thermoplastic resin B is 5° C. or more, preferably 5 to 40°, and more preferably 8 to 20° C. When the difference between the deflection temperatures under load is too small, a temperature dependence of an appearance of a phase difference decreases. When the difference between the deflection temperatures under load is too large, it is likely to be difficult to stretch a thermoplastic resin having a high deflection temperature under load, and a planarity of a retardation film is easy to decrease. It is preferable that the deflection temperature under load Ts(A) of the thermoplastic resin A is higher than the deflection temperature under load Ts(B) of the thermoplastic resin B.

Each of a rupture elongation of a thermoplastic resin A at a temperature of Ts(B) and a rupture elongation of a thermoplastic resin B at a temperature of Ts(A) is preferably 50% or more, and more preferably 80% or more. A retardation film may be stably prepared by stretching a thermoplastic resin having the rupture elongation in this range. The rupture elongation is measured by use of a test piece of type 1B described in JIS K 7127 at the drawing speed of 100 mm/minute Compounding agents may be added to thermoplastic resin A and/or thermoplastic resin B, if a total light transmittance in 1 mm thickness may be maintained to 80% or more. The compounding agent is not especially limited. Examples of the compounding agent include lubricants; lamellar crystal compounds; inorganic particulates; stabilizers such as antioxidant, thermal stabilizers, optical stabilizers, weathering stabilizers, ultraviolet absorbers, and near-infrared radiation absorbers; plasticizer; colorant such as dyes and pigments; antistatic agent; and the like. The amount of the compounding agent may be properly determined within a range where the object of the present invention is not ruined. In particular, lubricant or ultraviolet absorber may be preferably added to improve a flexibility and a weather resistance.

The lubricant includes inorganic particles such as silica dioxide, titanium dioxide, magnesium oxide, calcium carbonate, magnesium carbonate, barium sulphate, strontium sulphate and the like; organic particles such as polymethyl acrylate, polymethyl methacrylate, polyacrylonitrile, polystyrene, cellulose acetates, cellulose acetate propionates, and the like. In the present invention, the organic particle is preferable as the lubricant.

The ultraviolet absorber includes oxybenzophenone compounds, benzotriazol, compounds, salicylate ester compounds, benzophenone ultraviolet absorbers, benzotriazol ultraviolet absorbers, acrylonitrile ultraviolet absorbers, triazine compounds, nickel complex salt compounds, inorganic fine particles, and the like. The suitable ultraviolet absorber includes 2,2'-methylene-bis(4-(1,1,3,3-tetramethylbutyl)-6-(2 H-benzotriazol-2-yl)phenol), 2-(2'-hydroxy-3'-tert-butyl-5'-methyphenyl) -5-chlorobenzotriazol, 2,4-di-tert-butyl-6-(5-chlorobenzotriazol-2-yl)phenol, 2,2'-dihydroxy-4,41-dimethoxybenzophenone, and 2,2',4,4'-tetrahydroxybenzophenone. The especially suitable ultraviolet absorber includes 2,2'-methylene-bis(4-(1,1,3,3-tetramethylbutyl)-6-(2H-benzotriazol-2-yl)phenol).

A retardation film in the present invention has a stretching temperature $T_\alpha$ which causes delaying of a phase after the stretching to a phase before the stretching and a stretching temperature $T_\beta$ which causes hastening of a phase after the stretching to a phase before the stretching, in cases of uniaxially stretching in a direction of an X axis by draw ratio of 1.25 at temperature in the range that the retardation film can be stretched, in which the phase is of linearly polarized light ΨX having an oscillating surface of an electric vector in an X-Z plane and entering at an incident angle of 0 degree in relation to linearly polarized light ΨY having an oscillating surface of an electric vector in a Y-Z plane and entering at an incident angle of 0 degree, the X axis is an uniaxially stretching direction, the Y axis is a direction perpendicular to a direction of the X axis in the film plane, and the Z axis is a direction of a thickness of the film. That is, the retardation film in the present invention has a stretching temperature dependence as to whether a phase difference caused by a uniaxially stretching rises or drops from a phase difference before the stretching.

Linearly polarized light ΨX is represented by ΨX=sin(ωt+θ). Linearly polarized light ΨY is represented by ΨY=sin (ωt). θ is a phase difference of linearly polarized light ΨX to linearly polarized light ΨY in a retardation film of the present invention. ω is an angle rate, and t is a time. When a retardation film of the present invention is uniaxially stretched by draw ratio of 1.25 in a direction of the X axis at temperature at which the film can be stretched, a phase of ΨX against ΨY shift by Δθ. That is, linearly polarized light ΨX' after stretching is represented by ΨX'=sin(ωt'+θ−Δθ). Linearly polarized light ΨY' after stretching is represented by ΨY'=sin(ωt'). t' is a time. In case of ΨY'=ΨY, a retardation film in the present invention has a stretching temperature $T_\alpha$ that the Δθ is positive value and a stretching temperature $T_\beta$ that the Δθ is negative value.

A phase difference is a value which is obtained by multiplying a thickness d and a difference ($=n_X-n_Y$) between a refractive index $n_X$ in a direction of the X axis and a refractive index $n_Y$ in a direction of the Y axis. A phase difference of a laminate of a layer A and a layer B is synthesized from a phase difference of the layer A and a phase difference of the layer B.

To give a stretching temperature $T_\alpha$ that Δθ is positive value and a stretching temperature $T_\beta$ that Δθ is negative value to the retardation film, thicknesses of the layer A and the layer B are preferably adjusted so that a uniaxially stretching at high temperature $T_H$ causes $\Delta\theta_H$ to be more than $\Delta\theta_L$ and a uniaxially stretching at low temperature $T_L$ causes $\Delta\theta_H$ to be less than $\Delta\theta_L$, in which the $\Delta\theta_H$ is a change of a phase difference caused by the uniaxially stretching in a layer composed of material having a high deflection temperature under load and the $\Delta\theta_L$ is a change of a phase difference caused by the uniaxially stretching in a layer composed of material having a low deflection temperature under load.

It is preferable that a temperature that a change Δθ of the phase difference switches from positive value to negative value or from negative value to positive value is usually between {the higher of Ts(A) and Ts(B)} and [{the lower of Ts(A) and Ts(B)}−10° C.].

A ratio of the total thickness of layer(s) A/the total thickness of layer(s) B is preferably ⅕ to 1/10, and more preferably ⅙ to ⅛. If layer A is thick too much or layer B is thick too much, a temperature dependence of appearance of a phase difference decreases. The thickness of layer A and layer B is determined by measuring a total thickness of the film using a contact thickness gauge in the marketplace; cutting a portion where the thickness is measured; observing the cutting surface with a photon microscope to measure a ratio of a thickness of an each layers; and calculating the thickness of layer A and layer B from the ratio. The above-mentioned operations were done in a direction of MD and a direction of TD of the film at constant intervals, and a mean value of the thickness and the data spread of the thickness were determined.

Here, the data spread of thickness is calculated by the following expressions:

a data spread of a thickness (μm)=The larger of $T_{ave}-T_{min}$ or $T_{max}-T_{ave}$, in which $T_{max}$ represents the maximum value in the measured thickness T, $T_{min}$ represents the minimum value in the measured thickness T, and $T_{ave}$ represents an arithmetic mean value of thickness T measured by the above-mentioned measurements.

When the data spread of the thickness of layer A and layer B is 1 μm or less in an entire plane, a variability of a color tone is small and a change of a color tone after long-term using is uniform. The following steps are performed to adjust the data spread of the thickness of layer A and layer B to 1 lam or less in the entire plane: (1) a polymer filter having a mesh spacing of 20 μm or less is attached in an extruding machine; (2) a gear pump is rotated at 5 rpm or more; (3) an enclosure means is attached to surroundings of a die; (4) an airgap is set to 200 mm or less; (5) an edge pinning is performed when a film is cast to a cooling roll; and (6) a two axis extruding machine or a single axis extruding machine which has a double flight type screw is used as the extruding machine.

A retardation film in the present invention may have a layer other than layer A and layer B.

Examples of the other layer include a bonding layer to bond layer A and layer B, a mat layer to improve slipperiness of the film, a hard coat layer such as an impact-resistant polymethacrylate resin layer and the like, an antireflection layer, an antifouling layer, and the like. As defined above, layer A and layer B may be laminated through the bonding layer, but it is preferable that layer A and layer B are laminated in direct contact from the viewpoint of a molding property of the laminate and the retardation film and the durability of the retardation film.

A total thickness of a retardation film in the present invention is preferably 20 to 300 μm, more preferably 30 to 200 μm, and especially preferably 40 to 150 μm. When the total thickness is thinner than 20 μm, mechanical strength of the retardation film might weaken, When the total thickness is thicker than 300 μm, handling might be difficult since flexibility deteriorates.

A retardation film in the present invention meets a relation of $0.92 \leq R_{40}/Re \leq 1.08$, in which Re (nm) is a retardation value of light having a wavelength of 550 nm at an incident angle of 0 degree and $R_{40}$ (nm) is a retardation value of light having a wavelength of 550 nm at an incident angle of 40 degrees.

A retardation film in the present invention is preferably 50 to 400 nm, and more preferably 100 to 350 nm in retardation Re of light having a wavelength of 550 nm at an incident angle of 0 degree. Re and $R_{40}$ are the values which are measured by using the parallel Nicols rotation method (manufactured by OJi Scientific Instruments Co., Ltd.; KOBPA-WR) at wavelength 550 nm.

A retardation film in the present invention has a shrinkage percentage of preferably 0.5% or less, more preferably 0.3% or less in a longitudinal direction and transverse direction by heat-treating at 60° C., and 90% RH for 100 hours. When the shrinkage percentage exceeds this range, the transformation of the retardation film and the abrasion of the retardation film from the display device might be caused by the refractive stress in use under a high temperature and a high humidity environment.

A retardation film in the present invention is preferably 85% or more in a total light transmittance. When the total light transmittance is less than 85%, the retardation film may be unsuitable to an optical material. The light transmittance is measured by using a spectrophotometer (manufactured by JASCO Corporation; Ultraviolet Visible Near-infrared Spectrophotometer "V-570") in accordance with JIS K 0115.

A retardation film in the present invention is preferably 5% or less, more preferably 3% or less, and especially preferably 1% or less in a haze. When the haze is too high, a sharpness of a display image tends to decrease. Here, the haze is a mean value of turbidities measured at five places by using "Turbidimeter NDH-300A" manufactured by Nippon Denshoku Industries Co., Ltd. in accordance with JIS K 7361-1997.

A retardation film in the present invention is preferably 5 or less, and more preferably 3 or less in ΔYI. When the ΔYI is within the above-mentioned range, the visibility improves since there is not coloring. ΔYI is measured by using "Spectro color difference meter SE2000" manufactured by the Nippon Denshoku Industries Co., Ltd. in accordance with ASTM E313. The similar measurement is carried out five times, and the ΔYI is obtained as an arithmetic mean value of the measurements.

A retardation film in the present invention is preferably H or harder in the JIS pencil hardness. This JIS pencil hardness may be adjusted by changing a kind of a resin, changing the thickness of the resin layer, and the like. A surface of a film is scratched with a pencil having various hardness inclined to 45 degrees and pushed on at a load weight of 500 gram-weight, in accordance with JIS K 5600-5-4, sequentially from the pencil having low hardness, and the JIS pencil hardness means a hardness of the first pencil by which the scar is applied to the film.

A retardation film in the present invention is not particularly limited by the manufacturing method thereof. A preferable manufacturing method of a retardation film in the present invention comprises the steps of: preparing a laminate comprising an unstretched film (a) composed of a material having a positive intrinsic birefringence and a deflection temperature under load of Ts(A) and an unstretched film (b) composed of a material having a negative intrinsic birefringence and a deflection temperature under load of Ts(B); first simultaneously uniaxially stretching the laminate in a first direction at a temperature of T1 (° C.) that is a temperature higher than the lower of Ts(A) and Ts(B) by 5° C. or more; and a second simultaneously uniaxially stretching the laminate in a second direction that is different from the first direction at a temperature of T2 (° C.) that is a temperature lower than the higher of Ts(A) or Ts(B) and different from T1.

The Above-mentioned thermoplastic resin A and thermoplastic resin. B may be used as a material composing the unstretched film (a) and the unstretched film (b). The laminate for manufacturing a retardation film in the present invention preferably has a characteristic that a phase of linearly polarized light entering vertically into a principal surface and having an oscillating surface of an electric vector in an X-Z plane lags in case of uniaxially stretching in a direction of the X axis at temperature of T1 and leads in case of uniaxially stretching in a direction of the X axis at temperature of T2, against a phase of linearly polarized light entering vertically into a principal surface and having an oscillating surface of an electric vector in a Y-Z plane, wherein the X axis is a stretching direction, the Y axis is a direction perpendicular to the X axis direction in a plane, and the Z axis is a direction of a thickness of the laminate.

In a film having a characteristic that a slow axis appears in the X axis by uniaxially stretching, a phase of linearly polarized light having an oscillating surface of an electric vector in an X-Z plane lags against a phase of linearly polarized light having an oscillating surface of an electric vector in a Y-Z plane. Oppositely, in a film having a characteristic that a fast axis appears in the X axis by the uniaxially stretching, a phase of linearly polarized light having an oscillating surface of an electric vector in an X-Z plane leads against a phase of linearly polarized light having an oscillating surface of an electric vector in a Y-Z plane. A laminate preferably used in the present invention is a film which has a stretching temperature dependence of the direction where the slow axis or the fast axis appears.

The film that has the temperature dependence in such phase difference appearance may be obtained by laminating a layer of film (a) (layer a) composed of thermoplastic resin A having a positive intrinsic birefringence and a layer of film (b) (layer b) composed of thermoplastic resin B having a negative intrinsic birefringence with adjusting a relation such as an intrinsic birefringence of the thermoplastic resins and a thickness ratio of the resin layers, and the like.

A laminate for manufacturing a retardation film in the present invention may respectively have one layer or two or more layers of layer a composed of thermoplastic resin A (unstretched film (a)) and one layer or two or more layers of layer b composed of thermoplastic resin B (unstretched film (b)).

A phase difference is a value obtained by multiplying a thickness d by a difference ($=n_X-n_Y$) between a refractive index $n_X$ in a direction of an X axis that is a stretching direction and a refractive index $n_Y$ in a direction of a Y axis perpendicular to the stretching direction. A phase difference of a laminate or a layer a composed of thermoplastic resin A and a layer b composed of thermoplastic resin B is synthesized from a phase difference of the layer a and a phase difference of the layer b. To make the sign of the phase difference of a laminate comprising the layer a and the layer b reverse by stretching at high temperature $T_H$ and low temperature $T_L$, thicknesses of the layer a and the layer b is preferably adjusted so that an absolute value of the phase difference to which a resin having a high deflection temperature under load appears is smaller than an absolute value of the phase difference to which a resin having a low deflection temperature under load appears by stretching at low temperature $T_L$, and an absolute value of the phase difference to which a resin having a low deflection temperature under load appears is smaller than an absolute value of the phase difference to which a resin having a high deflection temperature under load appears by stretching at high temperature $T_H$. In this way, a laminate, which has a characteristic that a phase of linearly polarized light entering vertically into a plane of the laminate and having an oscillating surface of an electric vector in an X-Z plane lags in case of uniaxially stretching in a direction of the X axis at temperature of T1 and leads in case of uniaxially stretching in a direction of the X axis at temperature of T2 different from temperature of T1 against a phase of linearly polarized light entering vertically into a plane of the laminate and having an oscillating surface of an electric vector in a Y-Z plane, can be obtained by adjusting a difference between refractive index $n_X$ in a direction of the X axis and refractive index $n_Y$ in a direction of the Y axis that appears in each of the layer a and the layer b by uniaxially stretching, the total thickness of the layer a, and the total thickness of the layer b. Here, the temperature of T1 is a temperature either $T_H$ or $T_L$, and the temperature of T2 is a temperature either $T_H$ or $T_L$ different from T1.

FIG. 1 shows a temperature dependence of phase difference of layer a (a layer composed of thermoplastic resin A having a high deflection temperature under load) in a laminate when the Layer a of the laminate is stretched alone, a temperature dependence of phase difference of layer b (a layer composed of thermoplastic resin B having a low deflection temperature under load) in the laminate when the layer b of the laminate is stretched alone, and a temperature dependence of phase difference of the laminate (layer a+layer b) when the laminate is stretched. When stretching at a temperature of Tb, since a negative phase difference that appears by stretching the layer b is bigger than a positive phase difference that appears by stretching the layer a, then a negative phase difference Δ appears by stretching the laminate (layer a+layer b). When stretching at the temperature of Ta, since a negative phase difference that appears by stretching the layer b is smaller than a positive phase difference that appears by stretching the layer a, then a positive phase difference Δ appears by stretching the laminate (layer a+layer b).

For example, when the unstretched film a is made of a polycarbonate-based resin and the unstretched film b is made of a styrene-maleic anhydride copolymer, a ratio of the total thickness of unstretched film a and the total thickness of unstretched film b is preferably 1:5 to 1:15, and more preferably 1:5 to 1:10. If the unstretched film a is thick too much or the unstretched film b is thick too much, a temperature dependence of a appearance of a phase difference decreases.

A total thickness of the laminate is preferably 10 to 500 μm, more preferably 20 to 200 μm, and especially preferably 30 to 150 μm. When the total thickness is thinner than 10 μm, it is likely to be difficult to obtain an enough phase difference and mechanical strength of the laminate weaken when the total thickness is thicker than 500 μm, it is likely to be difficult to handle the laminate since flexibility of the laminate deteriorates.

The thickness of layer a and layer b is determined by the steps of: measuring a total thickness of the laminate by using a contacting thickness gauge in the market place; cutting a part where thickness is measured; observing the cutting surface with a photon microscope to measure a ratio of a thickness of each layer; and calculating the thickness of layer a and layer b from the ratio. The above-mentioned operations were done in the direction of MD and the direction of TD of the laminate at constant intervals, and a mean value of the thickness and the data spread of the thickness were determined.

Here, the data spread of thickness is calculated by the following expressions:

Data spread of a thickness(μm)=The larger of $T_{ave}-T_{min}$ or $T_{max}-T_{ave}$, In which $T_{max}$ represents the maximum value in measured thickness T. $T_{min}$ represents the minimum value in measured thickness T, and $T_{ave}$ represents an arithmetic mean value of thickness T measured by the above-mentioned measurements.

When the data spread of the thickness of layer a and layer b is 1 μm or less in the entire plane, the variability of a tone is small. Moreover, a change of the tone after long-term use is uniform.

The following steps are performed to adjust the data spread of the thickness of layer a and layer b to 1 μm or less in the entire plane: (1) a polymer filter having a mesh spacing of 20 μm or less is attached in an extruding machine; (2) a gear pump is rotated at 5 rpm or more; (3) an enclosure means is attached to surroundings of a die; (4) an airgap is set to 200 mm or less; (5) an edge pinning is performed when a film is cast to a cooling roll; and (6) a two axis extruding machine or a single axis extruding machine which has a double flight type screw is used as the extruding machine.

Examples of a method for manufacturing a laminate include a well-known method such as an coextrusion molding method such as a coextrusion T-die method, a coextrusion inflation method, a coextrusion lamination method, and the like; a film lamination molding method such as a dry lamination and the like; and a coating molding method such as a method of coating surface of a resin film with a resin solution, and the like; the simultaneously casting method; and the like. In particular, the coextrusion molding method is preferable from the viewpoint of producing efficiency and preventing from remaining volatile contents such as solvents in a laminate. The coextrusion T-die method is preferable in the coextrusion molding method. There area feed block manner and a multi manifold manner in the coextrusion T-die method. The multi manifold manner is especially preferable From the viewpoint of decreasing the data spread of the thickness of layer A.

When the coextrusion T-die method is employed as a method of obtaining a laminate, a temperature of melted resin material in extruding machine equipped with T-die is higher than a glass transition temperature (Tg) of the thermoplastic resin A by preferably 80 to 180° C., and by more preferably 100 to 150° C. When the melting temperature in the extruding machine is excessive low, a flowability of the resin material might be insufficient, oppositely when the melting temperature is excessive high, the resin might be deteriorated.

A temperature of extrusion may be properly selected according to a thermoplastic resin A used. A temperature of a resin slot is preferably Tg to (Tg+100)° C., a temperature of an exit of the extruding machine is preferably (Tg+50)° C. to (Tg+170)° C., and a temperature of a die is preferably (Tg+50)° C. to (Tg+170)° C., in which these temperatures are measured in the extruding machine.

In the extrusion molding method, a sheeted melted resin material extruded from an opening of the die is pinned on a cooling drum. A method of pinning the melted resin material on a cooling drum is not especially limited, and examples of the method include an air knife method, a vacuum box method, an electrostatic pinning method, and the like.

The number of cooling drums is usually two or more, though the number is not particularly limited. Moreover, examples of a method of arranging the cooling drums include a straight line type, a Z type, and an L type, though the method is not particularly limited. Moreover, the method of passing the melted resin extruded from the opening of the die between the cooling drums is not particularly limited.

In the present invention, the adhesion to the cooling drum of the extruded sheeted resin material changes, depending on the temperature of the cooling drum. The adhesion improves when a temperature of the cooling drum is raised. However, trouble that the sheeted resin material coils around the drum without peeling off from the cooling drum might occur when the temperature of the cooling drum is rained too much. Therefore, the temperature of the cooling drum is preferably not more than $(Tg+30)°$ C., and more preferably $(Tg-5)°$ C. to $(Tg-45)°$ C., in which Tg is a glass transition temperature of a thermoplastic resin A extruded from the die. The trouble such as slipping and the wounds may be prevented by doing so.

Moreover, it is preferable to reduce a content of a residual solvent in the film. Examples of the method for reducing the content include (1) a method of reducing residual solvent in thermoplastic resin as raw material; (2) a method of preliminary drying resin material before film is molded; end the like. The preliminary drying is done by using a hot air dryer and the like for example after the resin material is molded into the form such as pellets and the like. The dry temperature is preferable 100° C. or more, and the dry time is preferable two hours or more. By doing the preliminary drying, the residual solvent in the film may be decreased, and the extruded seated resin material may be prevented from forming.

The step of preheating a laminate may be comprised before the laminate is stretched. As a means for heating the laminate, an oven type heating device, a radiation heating device, soaking the laminate in a liquid, and the like are mentioned. In particular, the oven type heating device is preferable. R heating temperature in the preheating step is usually (the stretching temperature–40)° C. to (the stretching temperature+20)° C., and preferably (the stretching temperature–30)° C. to (the stretching temperature+15)° C. The stretching temperature means the preset temperature of the heating unit.

(First Stretching Process)

In the present invention, first of all, the laminate is simultaneously uniaxially stretched in a first direction at temperature of T1 (° C.), wherein T1 is higher than the lower of Ts(A) and Ts(B) by 5° C. or more.

In case of Ts(A)>Ts(B), the temperature T1 is higher than Ts(B) preferably by 5° C. or more, and more preferably by 5° C. to 15° C. In case of Ts(B)>Ts(A), the temperature T1 is higher than Ts(A) preferably by 5° C. or more, and more preferably by 5° C. to 15° C.

The first stretching process may be performed by a conventionally well-known method of which examples include a method of uniaxially stretching in a longitudinal direction by using the difference of rim speed between rolls, a method of uniaxially stretching in a transverse direction by using a tenter, and the like. The method of uniaxially stretching in a longitudinal direction includes an IR heating method between rolls, a floating method, and the like. The floating method is suitable from the viewpoint of obtaining a retardation film with high optical uniformity. The method of uniaxially stretching in a transverse direction includes a tenter method.

To reduce an irregular stretching and an irregular thickness, it is allowable to make a difference of a temperature in a direction of a width of the film in a stretching zone. To make the difference of the temperature in a direction of the width of the film in the stretching zone, well-known methods such as a method of adjusting a gate opening of a hot air nozzle in a direction of width, a method of setting IR heaters in a direction of width to control heating, and the like may be used.

(Second Stretching Process)

Then, the laminate is uniaxially stretched in a second direction at a temperature of T2 (° C.), wherein T2 is lower than the higher of Ts(A) and Ts(B). The temperature T2 is preferably lower than the temperature of T1, though the temperature of T2 is not particularly limited if the temperature T2 is different from the temperature of T1. Moreover, the temperature of T2 is preferably lower than both of Ts(A) and Ts(B).

In the second stretching process, a method that may be employed by the first stretching process may be employed as it is. A draw ratio in the second stretching process is preferably smaller than the draw ratio in the first stretching process.

The first direction in the first stretching process and the second direction in the second stretching process intersect preferably at an angle within a range of 89 degrees to 91 degrees.

After the first stretching process anti/or the second stretching process, a fixation process may be applied to the stretching film. A temperature in the fixation process is usually room temperature to (the stretching temperature+30)° C., and preferably (the stretching temperature–40)° C. to (the stretching temperature+20)° C.

A retardation film in the present invention may be employed as single or in combination with other members in a liquid crystal display device, an organic EL display device, a plasma display device, a FED (field emission) display device, and a SED (surface electric field) display device, or the like, since the retardation film can give advanced birefringence compensations.

A liquid crystal display device comprises a liquid crystal panel that a polarizing plate on an incident side of light, a liquid crystal cell, and a polarizing plate on an output side of light are arranged in this order. A visibility of the liquid crystal display device may be improved greatly by arranging the retardation film in the present invention between the liquid crystal cell and the polarizing plate on the light incident side and/or between the liquid crystal cell and the polarizing plate on the light output side. A drive mode for the liquid crystal cell includes In Plane Switching (IPS) mode, Vertical Alignment (VA) mode, Multi domain Vertical Alignment (MVA) mode, Continuous Pinwheel Alignment (CPA) mode, Hybrid Alignment Nematic (HAN) mode, Twisted Nematic (TN) mode, Super Twisted Nematic (STN) mode, Optical Compensated bend (OCB) mode and the like.

The retardation film in the present invention may be stuck to the liquid crystal cell or the polarizing plate. The retardation film may be stuck to both sides of the polarizing plate or to one side of the polarizing plate. Moreover, two or more sheets of the retardation films may be used. A well-known adhesive agent may be used for sticking. The polarizing plate is composed of a polarizer and protective films stuck to the both sides of the polarizer. The retardation film may be used as a protective film by sticking the retardation film in the present invention directly to the polarizer in place of the protective film. Since the protective film is omitted, the liquid crystal display device may be thinned.

EXAMPLES

The present invention will be explained more specifically with reference to EXAMPLES in the following. However, the present invention is not limited to the EXAMPLES. In the following EXAMPLES, "parts" or "%" is by weight unless otherwise specified.

(Thickness of a Transparent Film)

A thickness of a film was measured by a contacting thickness gauge. A film was embedded into an epoxy resins, the embedded film was sliced into pieces using a microtome (manufactured by YAMATO KOHKI INDUSTRIAL Co., Ltd.; "RUB-2100"), and then the cross-section of the piece was observed using a scanning electron microscope to determine a thickness of the each layer composing the film.

(Light Transmittance)

A light transmittance of a film was measured by using a spectrophotometer (manufactured by JASCO Corporation; Ultraviolet Visible Near-infrared Spectrophotometer "V-570") in accordance with JIS K 0115.

(Deflection Temperature Under Load)

A test piece was made in accordance with JIS K 7191, and a deflection temperature under load of a resin was measured.

(Re, $R_{40}$)

Re, $R_{40}$ and of a film in a wavelength of 590 nm, and an angle of a slow axis to a longitudinal direction were measured by using the parallel Nicols Rotation Method (manufactured by Oji Scientific Instruments Co., Ltd.; KOBRA-WR). The similar measurement was performed in a direction of, width of the retardation film at equal intervals by ten points, and the mean value was calculated.

Moreover, average refractive index $n_{ave}$ of a laminated film was determined according to the following expression.

$$n_{ave} = \Sigma(n_i \times L_i)/\Sigma L_i$$

$n_i$: refractive index of i-th layer resin
$L_i$: film thickness of i-th layer

In addition, $n_x$, $n_y$, $n_z$ and of the laminated film were calculated from the above-mentioned Re, $R_{40}$, $n_{ave}$, and thickness of the film.

(Durability Test)

A retardation film was left in an oven at 80° C. for 500 hours, and then Re, $R_{40}$, and of the retardation film were measured.

Producing Example 1

A film molding device for coextrusion molding of two kinds and two layers was prepared. Then, pellets of polycarbonate resin (manufactured by Asahi Chemical Industrial Co., Ltd., WONDER LIGHT PC-110, a deflection temperature under load of 145° C.) were put in one uniaxially extruding machine which was equipped with a screw of the double flight type, and were melted.

Pellets of styrene-maleic anhydride copolymer resin (manufactured by NOVA Chemicals Ltd., Dylark D332, a deflection temperature under load of 135° C.) were put in the other uniaxially extruding machine which was equipped with a screw of the double flight type, and were melted.

The melted polycarbonate resin at a temperature of 260° C. was supplied to one manifold in a multi manifold die (surface-roughness of the die lip Ra of 0.1 μm) through a polymer filter having a leaf disk shape and a mesh spacing of 10 μm, and the melted styrene-maleic anhydride copolymer resin at a temperature of 260° C. was supplied to the other manifold in the multi manifold die through a polymer filter having a leaf disk shape and a mesh spacing of 10 μm.

The polycarbonate resin and the styrene-maleic anhydride copolymer resin were extruded from the multi manifold die at the same time at 260° C. and were made into a melted resin film.

The melted resin film was cast on a cooling roll adjusted to 130° C. in the surface temperature, and then was passed between two cooling rolls that was adjusted to 50° C. in the surface temperature to obtain a laminate E1 being 1350 mm in width and 180 μm in thickness composed of the polycarbonate resin layer (layer A: 20 μm) and the styrene-maleic anhydride copolymer resin layer (layer B: 160 μm)

Producing Example 2

A laminate E2 being 1350 mm in width and 160 μm in thickness composed of the polycarbonate resin layer (layer A: 80 μm) and the polystyrene resin layer (layer B: 80 μm) was obtained in the same manner as in PRODUCING EXAMPLE 1, except that a polystyrene resin (manufactured by Japan Polystyrene Inc., HF44, a deflection temperature under load of 73° C.) was used in place of Dylark D332, a thickness of the layer A was adjusted to 80 μm and a thickness of the layer B was adjusted to 80 μm.

The laminate E1 and E2 were uniaxially stretched by draw ratio of 1.25 in a longitudinal direction of the laminate at stretching temperature of 70° C., 80° C., 120° C., 130° C., 135° C., 140° C., 145° C., or 150° C., respectively. Table 1 shows a lag in a phase of linearly polarized light entering vertically into a film plane and having an oscillating surface of an electric vector in an X-Z plane against a phase of linearly polarized light entering vertically into the film plane and having an oscillating surface of an electric vector in a Y-Z plane, wherein the X axis is an uniaxially stretching direction, the Y axis is a direction perpendicular to a direction of the X axis in the film plane, and the Z axis is a direction of a thickness of the film. The laminate E1 has a characteristic that a phase of linearly polarized light entering vertically into the film plane and having an oscillating surface of an electric vector in an X-Z plane leaded at 130° C. and lagged at 135° C. against a phase of linearly polarized light entering vertically into the film plane and having an oscillating surface of an electric vector in a Y-Z plane. As for the laminate E1, it was understood that a lag in a phase turned positive from negative at a temperature between 130° C. and 135° C. As for the laminate E2, a phase lagged at any stretching temperature.

[Table 1]

TABLE 1

| | Lag in phase at each stretching temperature (nm) | | | | | | | |
|---|---|---|---|---|---|---|---|---|
| | 70° C. | 30° C. | 120° C. | 130° C. | 135° C. | 140° C. | 145° C. | 150° C. |
| Laminated body E1 | Breaking | Breaking | Breaking | −205.1 | 10.9 | 97.9 | 88.6 | 42.9 |
| Laminated body E2 | Breaking | 862 | 992 | 983 | 1006 | 954 | 615 | 455 |

Example 1

The laminate E1 which was obtained in PRODUCING EXAMPLE 1 was supplied to a longitudinal uniaxially stretching machine, and the laminate was stretched in a longitudinal direction at a stretching temperature of 145° C. by a draw ratio of 1.5.

Then, the longitudinal uniaxially stretched film was supplied to a tenter stretching machine, the film was stretched in a transverse direction at a stretching temperature of 130° C. by a draw ratio of 1.25 to obtain a retardation film R1.

A retardation film R1 was stretched by draw ratio of 1.25 in one direction (for example, the direction of 0 degree against a direction of the longitudinal stretching being X axis) at the temperature described in Table 2. Then, a lag in a phase of linearly polarized light ΨX' entering at the incident angle of 0 degree and having an oscillating surface of an electric vector in an X-Z plane against a phase of linearly polarized light ΨY' entering at the incident angle of 0 degree and having an oscillating surface of an electric vector in a Y-Z plane was measured. And, the amount of a change from a lag in a phase of linearly polarized light ΨX against linearly polarized light ΨY before the stretching to the lag in the phase after the stretching was measured.

The retardation film R1 had a characteristic that a phase was delayed by 97 nm against a phase before stretching in case of stretching at 145° C., and a phase was hastened by 141 nm against a phase before stretching in case of stretching at 130° C. The retardation film R1 was 0.997 in $R_{40}$/Re, and satisfied the relation of $0.92 \leq R_{40}/Re \leq 1.08$. Table 2 shows the result of the durability test on the retardation film R1.

Example 2

A retardation film R2 was obtained in the same manner as in EXAMPLE 1, except that draw ratio in a transverse direction was changed to 1.5. The retardation film R2 had a characteristic that a phase was delayed by 80 nm against a phase before stretching in case of stretching at 145° C., and a phase was hastened by 117 nm against a phase before stretching in case of stretching at 130° C. The retardation film R2 was 1.006 in $R_{40}$/Re, and satisfied the relation of $0.92 \leq R_{40}/Re \leq 1.08$. Table 2 shows the result of the durability test on the retardation film R2.

Comparative Example 1

A retardation film R3 was obtained in the same manner as in EXAMPLE 1, except that the laminate E1 used in EXAMPLE 1 was changed to the laminate E2, the stretching temperature in a transverse direction was changed to 80° C. The retardation film R3 had a characteristic that a phase was delayed against a phase before stretching in case of any stretching temperatures. Table 2 shows the result of the durability test on the retardation film R3.

Comparative Example 2

A film made of polycarbonate resin (manufactured by Asahi Chemical Industrial Co., Ltd., WONDER LIGHT PC-110, a deflection temperature under load of 145° C.) having thickness of 30 μm was obtained by a single-layer extrusion molding. This single-layer film was supplied to a longitudinal uniaxially stretching machine, and the film was stretched in a longitudinal direction at a stretching temperature of 150° C. by a draw ratio of 1.2.

A film made of styrene-maleic anhydride copolymer resin (manufactured by NOVA Chemicals Ltd., Dylark D332, a deflection temperature under load of 135° C.) having thickness of 60 μm was obtained by a single-layer extrusion molding. This single-layer film was supplied to a tenter stretching machine, and the film was stretched in a transverse direction at a stretching temperature of 135° C. by a draw ratio of 1.5.

Two sheets of the obtained stretched film were stuck together by using the acrylic-based adhesive agent (thickness: 5 μm) to obtain a retardation film R4.

As for the retardation film R4, a phase was delayed against a phase before stretching at any stretching temperature. The retardation film R4 was 1.006 in $R_{40}$/Re and satisfied the relation of $0.92 \leq R_{40}/Re \leq 1.08$. Table shows the result of the durability test on the retardation film R4.

[Table 2]

TABLE 2

|  |  | Example | | Comparative Example | |
|---|---|---|---|---|---|
|  |  | 1 | 2 | 3 | 4 |
| Retardation Film |  | R1 | R2 | R3 | R4 |
| Re [nm] |  | 3.05 | 341 | 211 | 311 |
| $R_{40}$ [nm] |  | 304 | 343 | 304 | 313 |
| $R_{40}$/Re |  | 0.997 | 1.006 | 1.441 | 1.006 |
| Change of phase by stretching | stretching temperature |  |  |  |  |
|  | 70° C. | Breaking | Breaking | Breaking | Breaking |
|  | 80° C. | Breaking | Breaking | 431 | Breaking |
|  | 120° C. | Breaking | Breaking | 496 | Breaking |
|  | 130° C. | −141 | −117 | 492 | 407 |
|  | 135° C. | 9 | 7 | 503 | 520 |
|  | 140° C. | 93 | 75 | 477 | 538 |
|  | 145° C. | 97 | 80 | 308 | 486 |
| evaluation result |  |  |  |  |  |
| Durability | Re [nm] | 299 | 335 | 126 | 275 |
|  | $R_{40}$ [nm] | 297 | 336 | 186 | 302 |
|  | $R_{40}$/Re | 0.993 | 1.003 | 1.476 | 1.098 |

As shown in Table 2, as for the retardation film (EXAMPLE 1 and 2), which has a stretching temperature $T_\alpha$ which causes delaying of a phase after the stretching to a phase before the stretching and a stretching temperature $T_\beta$ which causes hastening of a phase after the stretching to a phase before the stretching, in cases of uniaxially stretching in a direction of an X axis by draw ratio of 1.25 at temperature in the range that the retardation film can be stretched, in which the phase is of linearly polarized light ΨX having an oscillating surface of an electric vector in an X-Z plane and entering at an incident angle of 0 degree in relation to linearly polarized light ΨY having an oscillating surface of an electric vector in a Y-Z plane and entering at an incident angle of 0 degree, and meets the relation of $0.92 \leq R_{40}/Re \leq 1.08$, has a small decreasing-value of $R_{40}$ and Re and maintains the relation of $0.92 \leq R_{40}/Re \leq 1.08$, even after the retardation film is left under a high temperature of 80° C. As a result, it is understood that a change of a birefringence compensation of a liquid crystal display device is not caused, then a image quality is kept even if it is left under a hot environment.

On the other hand, as for the retardation film (COMPARATIVE EXAMPLE 2), which has only a stretching temperature $T_\alpha$ which causes-delaying of a phase after the stretching to a phase before the stretching in cases of uniaxially stretching in a direction of an X axis by draw ratio of 1.25 at temperature in the range that the retardation film can be stretched, in which the phase is of linearly polarized light ΨX having an oscillating surface of an electric vector in an X-Z plane and entering at an incident angle of 0 degree in relation to linearly polarized light ΨY having an oscillating surface of an electric vector in a Y-Z plane and entering at an incident angle of 0 degree, has a large decreasing value of $R_{40}$ and Re and doesn't meet the relation of $0.92 \leq R_{40}/Re \leq 1.08$ after the retardation film is left under a high temperature of 80° C., even if the relation of $0.92 \leq R_{40}/Re \leq 1.0$ is satisfied before the retardation film is left under a hot environment. As a result, it is understood that a change of a birefringence compensation of a liquid crystal display device is caused, then a image quality is deteriorated.

What is claimed is:

1. A retardation film composed of
   a laminated film which comprises a layer A composed of a material having a positive intrinsic birefringence and a deflection temperature under load of Ts(A) and a layer B composed of a material having a negative intrinsic birefringence and a deflection temperature under load of Ts(B), in which a difference between Ts(A) and Ts(B) is 5° C. or more; and
   the retardation film has a property that
      a stretching temperature $T_\alpha$ applied to said retardation film causes a delay of a first phase with respect to a second phase after the stretching, as compared to a phase difference between said first and second phases before the stretching, when uniaxially stretching said retardation film in a direction of an X axis by a draw ratio of 1.25 at said temperature $T_\alpha$, said X axis being the uniaxially stretching direction, and
      a stretching temperature $T_\beta$ applied to said retardation film causes a hastening of the first phase with respect to the second phase after the stretching, as compared to a phase difference between said first and second phases before the stretching, when uniaxially stretching said retardation film in a direction of the X axis by the draw ratio of 1.25 at said temperature $T_\beta$, said X axis being the uniaxially stretching direction, and
   wherein a Y axis is a direction perpendicular to a direction of said X axis in the film plane, and a Z axis is a direction of a thickness of the film, and
   an X-Z plane is defined by said X axis and said Z axis, and an Y-Z plane is defined by said Y axis and said Z axis, and
   wherein said first phase is a phase of linearly polarized light $\Psi X$ having an oscillating surface of an electric vector in said X-Z plane and entering at an incident angle of 0 degree, and
   said second phase is a phase of linearly polarized light $\Psi Y$ having an oscillating surface of an electric vector in said Y-Z plane and entering at an incident angle of 0 degree,
   the retardation film meets a relation of $0.92 \leq R_{40}/Re \leq 1.08$, wherein Re (nm) is a retardation value of light having a wavelength of 550 nm at an incident angle of 0 degree, and $R_{40}$ (r =n) is a retardation value of light having a wavelength of 550 mm at an incident angle of 40 degrees.

2. The retardation film according to the claim 1, in which the layer A and the layer B are in direct contact.

3. The retardation film according to the claim 1, in which a ratio of the sum total thickness of the layer A/the sum total thickness of the layer B is ⅕ to 1/10.

4. The retardation film according to the claim 1, in which the material having a positive intrinsic birefringence is polycarbonate resins, and the material having a negative intrinsic birefringence is polystyrene resins.

5. A method for manufacturing the retardation film according to the claim 1 comprising steps of:
   preparing a laminate comprising an unstretched film (a) composed of a material having a positive intrinsic birefringence and a deflection temperature under load of Ts(A) and an unstretched film (b) composed of a material having a negative intrinsic birefringence and a deflection temperature under load of Ts(B);
   first simultaneously uniaxially stretching the laminate in a first direction at a temperature of T1 (° C.) that is higher than the lower of Ts(A) and Ts(B) by 5° C. or more; and
   second simultaneously uniaxially stretching the laminate in a second direction that is different from the first direction at a temperature of T2 (° C.) that is lower than the higher of Ts(A) and Ts(B) and is different from T1.

6. The method for manufacturing the retardation film according to the claim 5, in which T2 is lower than both Ts(A) and Ts(B).

* * * * *